May 21, 1963 A. N. MONTGOMERY 3,090,191

SECONDARY CLOCK SETTING MEANS

Filed Sept. 29, 1960 5 Sheets-Sheet 1

INVENTOR.
ARVID N. MONTGOMERY
BY Alfred W. Petchaft
atty

May 21, 1963 A. N. MONTGOMERY 3,090,191

SECONDARY CLOCK SETTING MEANS

Filed Sept. 29, 1960 5 Sheets-Sheet 2

INVENTOR.
ARVID N. MONTGOMERY
BY
Alfred W. Petchaft

May 21, 1963 A. N. MONTGOMERY 3,090,191

SECONDARY CLOCK SETTING MEANS

Filed Sept. 29, 1960 5 Sheets-Sheet 3

INVENTOR.
ARVID N. MONTGOMERY
BY
Alfred W. Petchaft

INVENTOR.
ARVID N. MONTGOMERY
BY
Alfred W. Petchaft
Atty

INVENTOR.
ARVID N. MONTGOMERY
BY
Alfred W. Petchaft
atty.

1

3,090,191

SECONDARY CLOCK SETTING MEANS

Arvid N. Montgomery, Owensville, Ind., assignor to Montgomery Manufacturing Company, Inc., Owensville, Ind., a corporation of Indiana Filed Sept. 29, 1960, Ser. No. 59,360

12 Claims. (Cl. 58—34)

This invention relates in general to electrical clock systems and, more particularly, to a secondary clock having resetting and correction mechanism responsive to impulses periodically initiated by a master clock.

It is the primary object of the present invention to provide a clock system having a secondary clock uniquely adapted for resetting and correction response to a remotely initiated impulse.

It is another object of the present invention to provide a secondary clock having resetting and correction mechanism in which the hour hand, minutes hand, and seconds hand can be corrected or synchronized responsive to remotely initiated impulses.

It is, more particularly, an object of the present invention to provide time-correction mechanism for a secondary clock by which the minutes and seconds hands can be synchronized once each hour and the hour hand can be synchronized once every twelve hours.

It is an additional object of the present invention to provide a secondary clock having a resetting and correction means which is capable of correcting the hour hand when the clock is fast as well as when the clock is slow.

With the above and other objects in view, my invention resides in the novel features of form, construction, arrangement, and combination of parts presently described and pointed out in the claims.

In the accompanying drawings (five sheets)—

Figure 1:
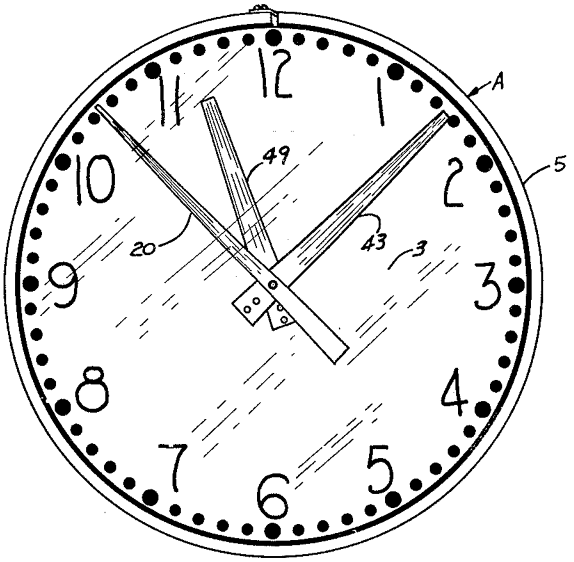
FIG. 1 is a front elevational view of an electrical clock constructed in accordance with and embodying the present invention.
Figure 4:
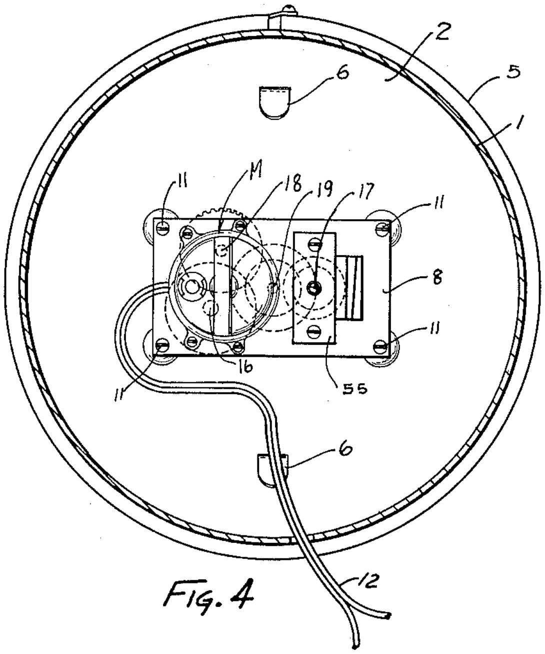
FIG. 4 is a rear sectional view taken along line 4—4 of FIG. 2.
Figure 2:
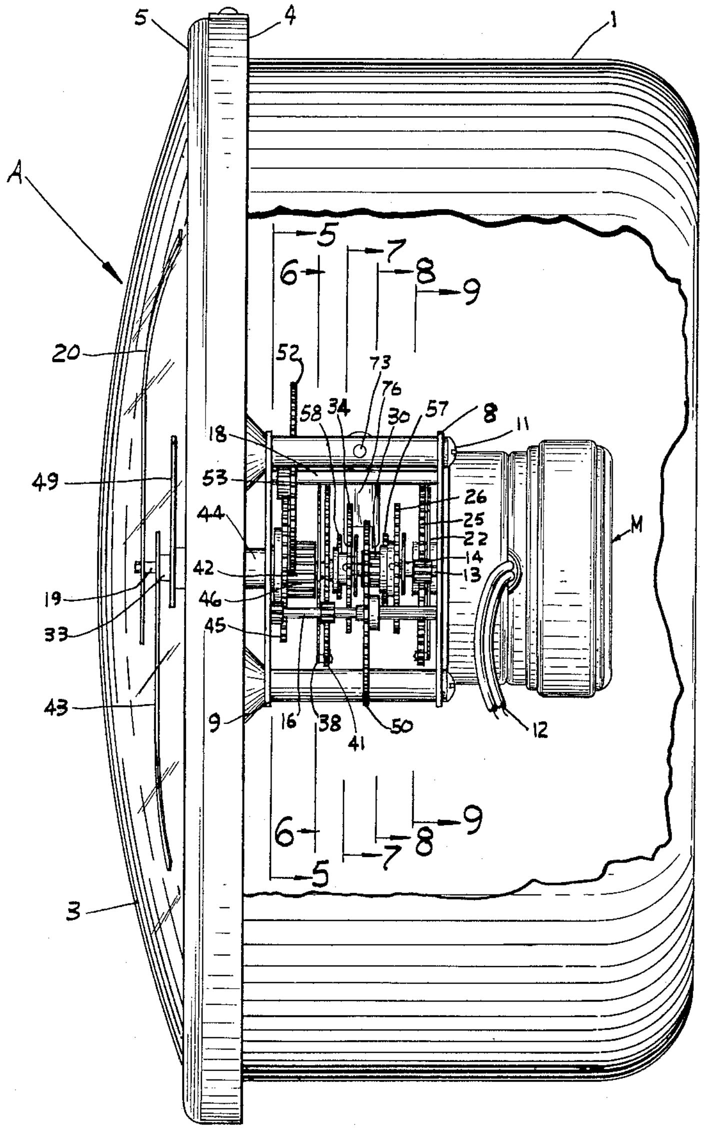
FIGS. 2 and 3 are right side and top side elevational views, respectively, partly broken away to show the internal mechanism thereof.
Figure 3:
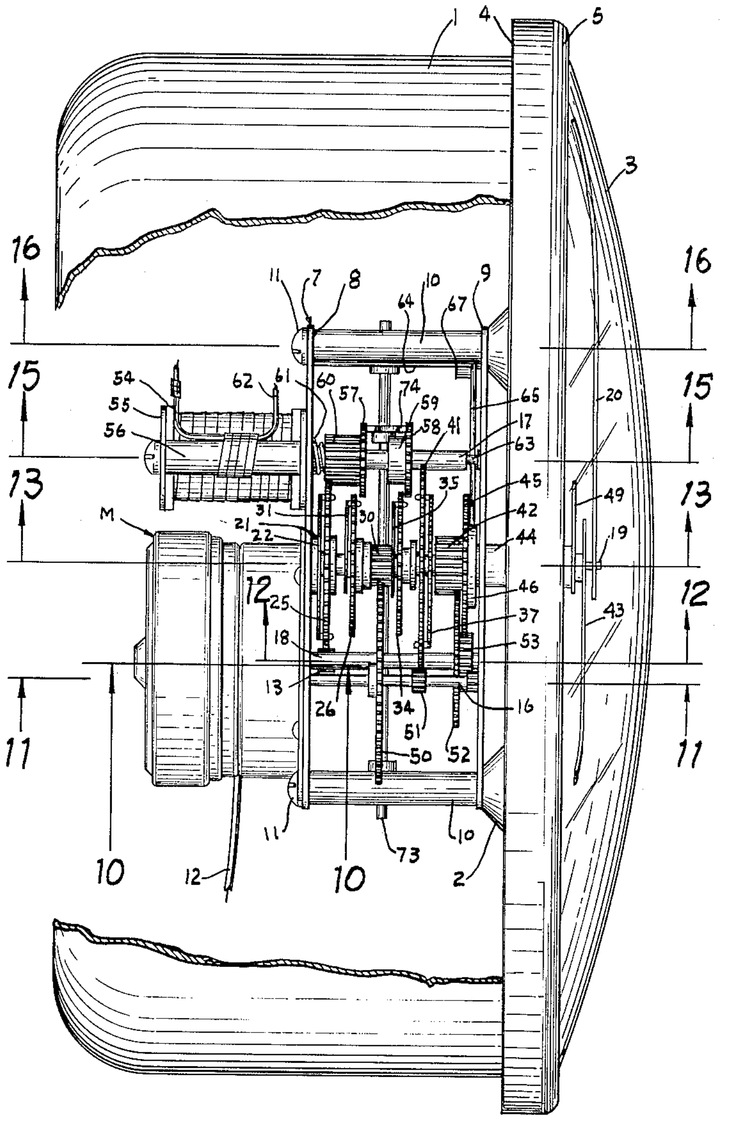
Figure 5:
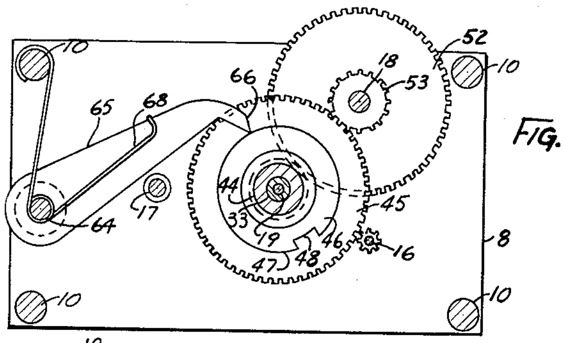
Figure 6:
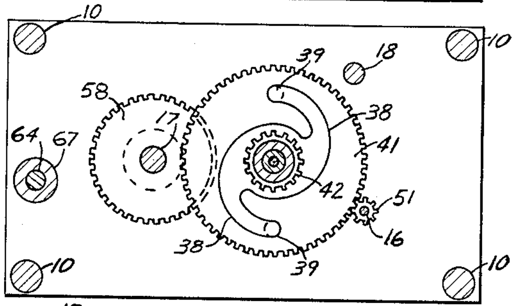
Figure 10:
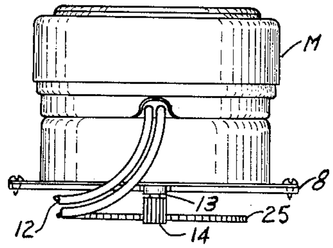
Figure 7:
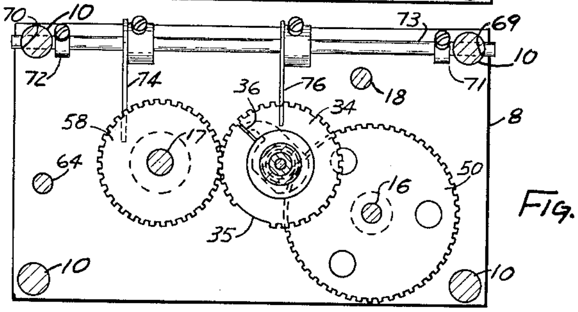
Figure 8:
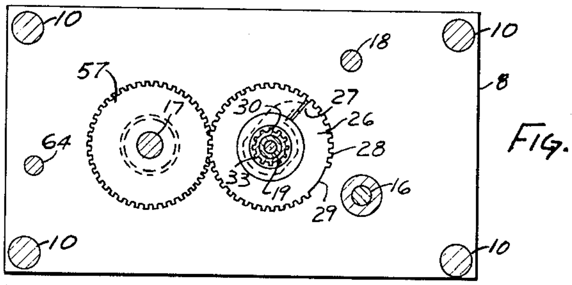
Figure 9:
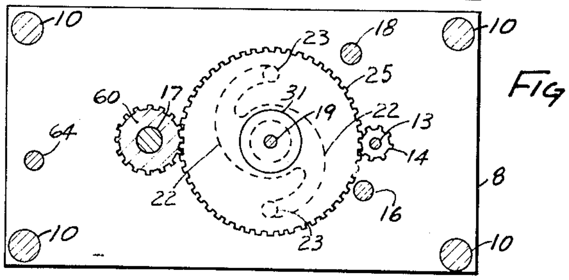
Figure 11:
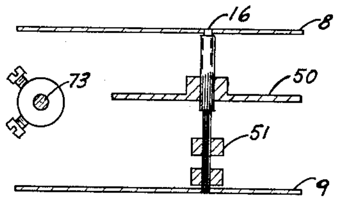
Figure 12:
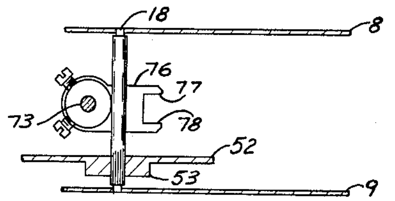
Figure 13:
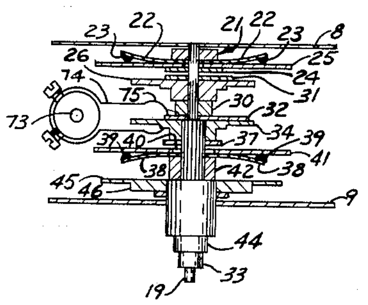
Figure 14:
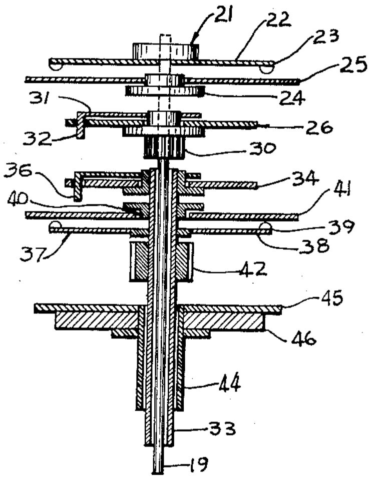

FIGS. 5, 6, 7, 8, and 9, are fragmentary sectional views taken along lines 5—5, 6—6, 7—7, 8—8, and 9—9, respectively of FIG. 2;

FIGS. 10, 11, 12, and 13, are fragmentary sectional views taken along lines 10—10, 11—11, 12—12, and 13—13, respectively, of FIG. 3;

FIG. 14 is an exploded sectional view substantially similar to FIG. 13; and

Figure 15:
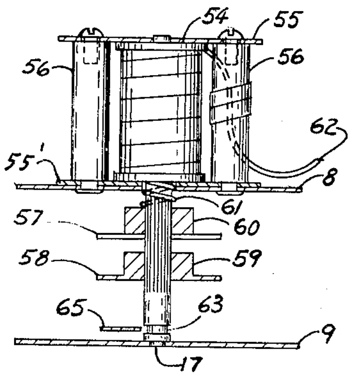
Figure 16:
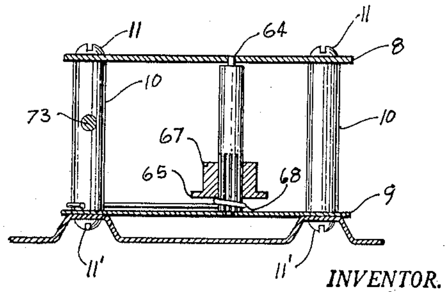

FIGS. 15 and 16 are fragmentary sectional views taken along lines 15—15, 16—16, respectively, of FIG. 3.

Referring now in more detail and by reference characters to the drawings, which illustrate a preferred embodiment of the present invention, A designates a clock comprising a hollow substantially cylindrical shell 1 in which is mounted a face plate 2 having a suitably imprinted dial-face 3 and crystal 4, the plate 2, the dial-face 3, and the crystal 4 being marginally secured together by a clamping rim 5. Preferably, though not necessarily, the plate 2 is provided with a pair of rearwardly projecting ears 6 in case it is desired to mount the clock A flushwise upon a wall recess.

2

Provided for disposition within the shell 1 is a clock mechanism 7 comprising a pair of spaced plates 8, 9, held in parallel spaced relationship by means of a plurality of spacer-rods 10 and bolts 11 which extend into, and are threadedly engaged in, the rear ends of the rods 10. At their forward ends, the rods 10 are similarly secured to the face plate 2 by means of bolts 11'. Mounted on the back of the rear plate 8 is a conventional synchronous motor M provided with a pair of wires 12 suitable in connection to a source of electrical power and also being provided with a drive shaft 13 which extends through an aperture in the rear plate 8 and is provided on its end with a drive gear 14, for purposes presently more fully appearing.

Journaled between the plates 8, 9, in spaced relation, are four rotatable shafts 16, 17, 18, 19, the shaft 19 extending through the plate 2 of the clock and having the conventional sweep second hand 20 attached thereto outwardly of the face 3. A spring-type friction clutch 21 is secured to the shaft 19 and is provided with a plurality of radially outwardly extending arms 22 each respectively provided at their outer ends with an inwardly projecting friction surface 23. Staked on the shaft 19 is a nylon hub 24 and rotatably mounted thereon is a so-called master gear 25 provided with a plurality of teeth which are in continuous meshing engagement with the drive gear 14. It should be noted that the master gear 25 is not, in itself, secured to the shaft 19, but only causes the shaft 19 to rotate through the spring-type friction clutch 21 and thereby drive the sweep-second hand 20. Also secured to the shaft 19 in slightly spaced relation from the hub 24 is a seconds reset gear 26 provided with a radial slot 27, (FIG. 8), located between two of its teeth. It should be noted that the seconds reset gear 26 is smaller in size and substantially thicker than the master gear 25 and, in addition, the seconds reset gear 26 is provided with a plurality of peripheral teeth 28 which almost totally encircle the reset gear 26, except for a small arcuate portion 29 of the periphery. In abutment with the seconds reset gear 26 on the shaft 19 is a minutes driving pinion 30, the latter being staked to the shaft 19 and also being substantially smaller than the seconds reset gear 26. Rigidly mounted in the shaft 19 in facewise abutment adjacent the seconds reset gear 26 is a thin plate-like member 31 having an axially projecting stop-finger 32 extending through the slot 27. Rotatably disposed on the shaft 19 adjacent the driving pinion 30 is a minutes tube 33 and staked on the end of the minutes tube 33 is a minutes reset gear 34, which preferably, though not necessarily, is of the same external dimensions and configuration as the seconds reset gear 26, the two gears differing only in respect to the central apertures required for attachment to the shaft 19 and the tube 33, respectively. Like the seconds reset gear 26, the minutes reset gear 34 is provided with a plurality of peripheral teeth which almost completely encircle the periphery of the reset gear 34 except for a small arcuate gap 35 where none of the teeth are included and a stop-finger 36, the latter being identical with the stop-finger 32. Staked to the minutes tube 33 in slightly spaced relation from the minutes reset gear 34 is a spring-type friction clutch 37 including a pair of radially extending arms 38, each provided on its end with a friction surface 39 similar to the friction clutch 21. Also staked to the minutes tube 33, adjacent the friction clutch 37 is a nylon hub 40 which rotatably supports a coupling gear 41, whereby a rotating force is transferred to the tube 33 through the friction clutch 37 as the gear 41 is rotated. Staked to the minutes tube 33 in a slighly spaced relation from the nylon hub 40 is an hour pinion 42. It should be noted that the minutes tube 33 extends through the face plate 2 and the dial-face 3 in the conventional manner and is provided at its forward end, between the crystal 4 and the dial-face 3, with a conventional minutes hand 43 whereby when the tube 33 rotates with respect to the shaft 19, the minutes hand 43 is caused to move with respect to the dial-face 3. Roatably and telescopically disposed on the minutes tube 33, in endwise abutment against the forwardly presented face of the hour pinion 42, is an hour tube 44 and staked thereon is a coupling gear 45 and a cam wheel 46 which has a substantially cylindrical outer periphery 47, the periphery 47 being provided with a radially inwardly projecting notch 48 for purposes presently more fully appearing. The hour tube 44 also projects into the space between the dial-face 3 and the crystal 4 and is provided at its end with an hour hand 49 in the conventional manner.

Staked to the shaft 16 in meshing relation to the minutes driving pinion 30 is a train gear 50, (FIG. 7), whereby, as the minutes driving pinion 30 is rotated on the shaft 19, the shaft 16 is rotated. Also staked to the shaft 16 in meshing relation with the coupling gear 41, is a substantially smaller transfer pinion 51 for transferring the rotational forces from the pinion 30 to the gear 41 as the shaft 19 is rotated. It should be noted that the respective tooth ratios between the pinion 30, the gears 41 and 50, and the pinion 51 are numerically predetermined in the conventional manner, whereby the minutes tube 33 will make one complete revolution for every 60 complete revolutions of the seconds shaft 19. The shaft 18 is provided with a receiving gear 52 and a transfer gear 53, the gear 52 being located in alignment with the hour pinion 42 on the minutes tube 33 for causing the shaft 18 to rotate as the minutes tube 33 rotates and the transfer gear 53 is in alignment with, and intermeshed with, the coupling gear 45 on the hour tube 44, whereby as the tube 33 is rotated, the hour tube 44 is caused to rotate. It should be noted that the tooth ratios between the hour pinion 42 and the receiving gear 52 and between the transfer gear 53 and the coupling gear 45 are mathematically predetermined in the conventional manner, whereby the hour tube 44 is caused to make one complete revolution for every 12 revolutions of the minutes tube 33.

The shaft 17, (FIG. 15), in addition to being journaled between the plates 8, 9, is also adapted for axial movement therebetween and extends rearwardly past the plate 8 into the core of a solenoid 54. Mounted adjacent to the plate 8 is a plate 55 and in outwardly spaced parallel relation thereto is a second plate 55′ which is attached thereto by means of a pair of spacer sleeves 56. The solenoid 54 is secured between the plates 55, 55′, in the manner shown in FIG. 15.

The plates 55, 55′, and the sleeves 56 are made of magnetic material in order to complete the magnetic path through the solenoid 54, the plates 55, 55′, and the shaft 17, which act as the plunger of the solenoid 54. This makes it possible to provide the necessary magnetic pull with a much smaller number of ampere turns on the solenoid coil. Secured to the shaft 17 in spaced relation is a pair of spaced correcting gears 57, 58, of similar size and shape, the gears 57, 58, being separated by a diametrally reduced hub 59 which has an axial length equal to the spacing of the reset gears 26, 34, on the shaft 19 and tube 33. Also secured to the shaft 17 in meshing engagement with the master gear 25 is an elongated drive gear 60 having a toothed periphery which is also elongated for purposes of retaining meshed engagement with the master gear 25 as the shaft 17 is shiftably moved between the plates 8, 9. The shaft 17 is normally biased away from the core of the solenoid 54 by a spring 61. When the solenoid 54 is energized by a signal applied through the conventional cable attachment 62, the shaft 17 is drawn into the core of the solenoid 54 against the bias of the spring 61. Milled into the shaft 17 near the end adjacent the plate 9 for movement with the shaft 17 is an annular groove 63, for purposes presently more fully appearing. It should be noted that the correcting gears 57, 58, are located on the shaft 17 to be out of engagement with the gears 26, 34, when the solenoid 54 is de-energized and in engagement with the gears 26, 34, respectively, when the solenoid 54 is energized. A rod 64, (FIGS. 5 and 6), is secured to, and extends between, the plates 8, 9, in slightly spaced relation from the shaft 17. Secured to and carried by the rod 64 for rocking movement therewith is an elongated lever arm 65 provided on its outer end with a tab 66 which projects toward the cam wheel 46 on the hour tube 44. The lever arm 65 also includes a hub 67 which projects toward the shaft 17, and it should be noted that the lever arm 65 is located in such manner that the shoulder 67 and the tab 66 are on the same side of the shaft 17 with respect to the central second hand shaft 19. The lever arm is biased toward the shafts 17, 19, by a spring 68 which is connected to the arm 65 and one of the spacer rods 10 in the conventional manner.

Journaled through axially aligned apertures 69, 70, (FIGS. 7 and 16), in the upper spacer-rods 10 between the plates 8, 9, and operatively held therein by means of conventional set-collars 71, 72, is a shaft 73. Mounted on the shaft 73 in proximity to the shaft 17 and extending into the space between the gears 57, 58, above the hub 59 is an elongated arm 74 provided at its end with an enlarged arcuate portion 75, the arcuate portion 75 being sized for simultaneous abutment with the complementary faces of the gears 57, 58, whereby when the solenoid is energized and the shaft 17 is drawn into the solenoid 54, the arm 74 is rocked and the rod shaft 73 is caused to pivot. Attached to the shaft 73 in alignment with the seconds reset gear 26 and the minutes reset gear 34 is a stopping arm 76 comprising a pair of spaced outwardly extending parallel stop members 77, 78, the stopping arm 76 being adapted for pivotal movement with the shaft 73 and the parallel members 77, 78, being sized and located so that, as the shaft 73 is pivoted, said parallel members 77, 78, will come into facewise contact with the stop-fingers 32, 36, respectively associated with the seconds reset gear 26 and the minutes reset gear 34.

In use, the synchronous motor M is conventionally connected to a source of electrical power which drives the drive gear 14 continuously, which, in turn, causes the master gear 25 on the shaft 19 and the drive gear 60 on the shaft 17 to rotate continuously. As long as the solenoid 54 is in the de-energized position, the spring-type friction clutch 21 is in gripping contact with the master gear 25 and the shaft 19 is rotated at the desired speed. While the shaft 19 is rotating, the minutes tube driving gear 30, the receiving gear 50, the transfer gear 51, and the coupling gear 41, also rotate, and the minutes tube 33 is rotated at the conventional speed due to the inter-relation of the coupling gear 41 and the friction clutch 37. By means of the inter-relation of the hour tube, drive gear 42, the receiving gear 52, the transfer gear 53, and the coupling gear 45, the hour tube is rotated with the minutes tube at the proper speed. Thus, it can be seen that when the solenoid 54 is not energized, the clock A operates in the conventional manner with all hands mechanically interconnected and continuously moving. It should also be noted that because of the step-up ratio between the gears 25, 60 (FIG. 9) the shaft 17 is also in continuous rotation at an appreciably higher angular velocity than the angular velocity of the shaft 19.

Synchronization of the minutes hand 43 and the seconds hand responsive to an impulse generated by a master clock (not shown) may be achieved at spaced intervals, which preferably, though not necessarily, are hourly, although it should be noted that, with the present invention, synchronization can be achieved on even multiples of hours also. Synchronization is initiated by energization of the solenoid 54, whereupon the shaft 17 is urged rearwardly into the core of the solenoid 54 against the bias of the spring 61. The drive gear 60, being axially elongated, remains in meshing engagement with the master gear 25, and, accordingly, the shaft 17 remains in rotation during energization of the solenoid 54. Energization of the solenoid 54 brings the gears 26 and 57 and the gears 34, 58, respectively, into meshing engagement, whereupon the shaft 19 and the minutes tube 33 are caused to rotate at a substantially increased speed with respect to the original driving speed due to the direct coupling between the gears 26, 34, and the master gear 25 as opposed to the friction-type coupling of normal operation. Due to the increased rotational velocity of the shaft 19, the friction clutch 21 will slip with respect to the master gear 25 and, similarly, the friction clutch 37 will slip with respect to the coupling gear 41 due to the increased velocity of the minutes tube 33. The energization of the solenoid 54 also rocks the arm 74 disposed between the coupling gears 57, 58, and rotates the rod 73 which, in turn, causes the parallel stop members 77, 78, of the stopping arm 76 to be brought into the path of the stop fingers 32, 36, respectively. It should be noted that, when the solenoid 54 is energized, the correcting gear 57 drives the gear 26 and the shaft 19 at high resetting speed until the gap 29 comes into alignment with the teeth of the correcting gear 57 whereupon the gear 26 becomes disengaged from the correcting gear 57. The gap 29 is positioned at such location on the periphery of the gear 26, that this disengagement will occur just slightly before the stop-finger 32 comes into abutment with the stop-member 77 and thereupon the gear 26 and shaft 19 will continue to travel at normal speed through the driving action of the clutch 21 until such abutment between the stop-finger 32 and the stop-member 77 is attained so that the gear 26 and shaft 19 are brought to a standstill at "correct-time" position and held at such position until released. The driving connection between the shaft 17 and the shaft 19 will continue until the seconds reset gear 26 attains a position wherein the arcuate gap 29 is presented to the coupling gear 57, whereupon the intermeshing of the gears 26, 57, will be lost. In like manner, rapid movement of the minutes tube 33 will continue until the arcuate gap 35 is presented to the teeth of the coupling gear 58, whereupon engagement between the two gears will be lost and rapid rotation of the minutes tube 33 will cease.

Similarly, when the solenoid 54 is energized, the correcting gear 58 drives the gear 34 and it, in turn, drives both the minute tube 33 and the hours tube 44 at a high resetting speed until the gap 35 comes into alignment with the teeth of the correcting gear 58 whereupon the gear 34 becomes disengaged from the correcting gear 58. The gap 35 is likewise positioned at such location on the periphery of the gear 34, that this disengagement will occur just slightly before the stop-finger 36 comes into abutment with the stop-member 78. Thereupon, the gear 34 and its related tubes 33, 44 will be rotated by the sweep-second shaft 19 through the pinion 30 which is always in mesh with the train gear 50 on the shaft 16, which, in turn, rotates the transfer pinion 51 and this rotates the gear 41. This, in turn, operates through friction clutch 37 to drive the minute tube 33 and causes the gear 34 to continue rotation through a final small increment of time until the stop-finger 36 comes into abutment with the stop-member 78 and the minute tube 33 is brought to a standstill at "correct-time" position and held at such position until released. This latter series of correcting operations will take place as described if the minute tube 33 is leading the sweep second shaft 19 at the moment of the correcting impulse. If, however, the minute tube 33 is lagging behind the sweep second shaft 19, the minute tube 33 will come to a standstill as soon as the gap 35 causes disengagement between the correcting gear 58 and the gear 34. In this latter situation, the minute and hour hands will not be brought precisely up to "correct time" position but will remain a few fractions of a degree behind "correct time" position when released at the end of the correcting interval, and will remain in this very slight lagging relationship until the next correcting interval. This error is, however, so small that it is not visually observable for all practical purposes. In fact, the incremental error will not exceed a few seconds and since the sweep-second shaft 19 is always corrected to exact time, the fact that the minute hand 20 is a few seconds slow will not be significant.

It should also be noted that the friction clutches 21, 37, will continue to slip for the increment that the stop-members 77, 78, are in abutment with the stop-fingers 32, 36. Thus, it can be seen that when the synchronizing signal is initiated by the master clock, the minutes and seconds hands of the secondary clock A will be immediately brought to the "correct time" position and held in said position until the synchronizing signal has ceased. Upon de-energization of the solenoid 54, the clock A will resume normal time-keeping operation. With a plurality of secondary clocks all inter-connected to a master synchronizing clock, it is possible to cause simultaneous synchronization of all clocks at regular intervals.

Preferably, though not necessarily, the clock system should be arranged to synchronize all secondary clocks which are connected in the system on the hours where the minutes and second hands are in direct alignment. Such an arrangement, though not required for successful operation of the system, has been found to be best in that the gaps 29, 35, in the reset gears 26, 34, and the stop-fingers 32, 36, on the same reset gears may be directly aligned, thereby simplifying assembly.

In the event that more than one secondary clock is connected on the circuit, the resetting and correcting action just described will occur in each and the sweep hands and minutes hands of all the clocks will be synchronized.

Synchronization of hours hands is achieved at twelve hour intervals in the following manner. A particular hour for synchronization is selected and the cam wheel 46 is arranged on the hour tube 44 in such manner that the notch 48 will accept the tab 66 of the lever 65 just as the minutes and seconds hands reach correct time with respect to the master clock whereby the gaps 29, 35, will be substantially in facewise presentation with the coupling gears 57, 58. For purposes of illustration only, the synchronizing hour has been selected as five o'clock as it has been found that in most industrial and educational buildings five is the best hour for clock synchronization. Preferably, though not necessarily, the master clock system is arranged so that an hour hand synchronization signal will only occur at five in the morning although the system is readily adaptable to hour hand synchronization every twelve hours without any changes. If the hour hand position is correct when the hour hand synchronizing signals are initiated, the tab 66 will be at rest in the notch 48, and the edge of the arm 65 will be engaged in the groove 63 so that when the solenoid 54 is energized, the shaft 17 will be prevented from being drawn into the core thereof. If the hour hand is not in the proper position, the tab 66 will not be in the notch 48 and when the first hour synchronization signal is issued, the minutes tube and seconds shaft synchronization cycle will be repeated, whereupon the minutes and seconds hands will be rotated clockwise with respect to the face of the clock and the hour hand will be moved forward a distance corresponding to one hour, after which the synchronizing signal will be turned off. The master clock is arranged to provide eleven synchronizing signals at spaced intervals of several minutes during the time elapsed between the hours of five and six. If the hour hand is eleven hours in error due to a power failure or a blown fuse or some other reason, the hour hand will be moved a distance representative of one hour during every synchronizing period between the hours of five and six. If the hour hand is less than eleven hours in error, it will be moved successively during each synchronizing period until the tab 66 engages the notch 48, whereupon further synchronizing action will be prevented by reason of the fact that the edge of the arm 65 has dropped into the groove 63, thereby preventing further axial movement of the shaft 17. It should also be noted that the adjustment of the cam 46 is such that tab 66 will drop into the cam notch 48 after the start of the hourly correction and preferably before the completion of this operation. In any event, it must drop into the notch less than two minutes after the completion of the regular hourly correction in order that the unit will not accept any of the twelve hour corrections if the unit is on time. With the notch 48 sized for receiving the tab 66 only during the time required for the eleven synchronizing periods, the clock A will be brought into complete synchronization with the master clock at six when the next minutes and seconds synchronization signal is issued therefrom.

It should be understood that changes and modifications in the form, construction, arrangement, and combination of the several parts of the secondary clocks for electrical clock systems may be made and substituted for those herein shown and described without departing from the nature and principle of my invention.

Having thus described my invention, what I claim and desire to secure by Letters Patent is:

1. A synchronous clock comprising a housing having a face plate attached thereto and including a pair of spaced opposing plates, a seconds shaft journaled between said plates, a minutes tube journaled on said seconds shaft, an hours tube journaled on said minutes tube, a synchronous motor operatively mounted on said housing, first driving means for coupling the seconds shaft to the synchronous motor, second driving means for coupling the minutes tube to the seconds shaft, third driving means for coupling the hours tube to the minutes tube, first corrective means for rotating the seconds shaft to a predetermined position independently of the first driving means and at an accelerated speed, second corrective means for rotating the minutes tube to a predetermined position independently of the second driving means and at an accelerated speed, said first and second corrective means being normally idling between said opposing plates but being adapted for operation upon shifting movement therebetween, means for limiting the movement of the seconds shaft and minutes tube during operation of the first and second corrective means, means for initiating operation of the first and second corrective means by means of an electrical impulse initiated at a point remote from the clock, and indicia means for revealing the relative positions of the seconds shaft and the minutes and hours tubes.

2. The device of claim 1 wherein the first and second corrective means each drive the seconds shaft and the minutes tube respectively at the same angular speed.

3. A synchronous clock comprising a housing having a face plate attached thereto and including a pair of spaced opposing plates, a seconds shaft journaled between said plates, a minutes tube journaled on said seconds shaft, an hours tube journaled on said minutes tube, a synchronous motor operatively mounted on said housing, a master gear loosely disposed on the seconds shaft and being operatively connected to the synchronous motor for regulated movement with respect thereto, first driving means for coupling the seconds shaft to the master gear, second driving means for coupling the minutes tube to the seconds shaft, third driving means for coupling the hours tube to the minutes tube, first corrective means for rotating the seconds shaft to a predetermined position independently of the first driving means and at an accelerated speed, second corrective means for rotating the minutes tube to a predetermined position independently of the second driving means and at an accelerated speed, said first and second corrective means being normally idling between said opposing plates but being adapted for operation upon shifting movement therebetween, means for limiting the movement of the seconds shaft and minutes tube during operation of the first and second corrective means, means for initiating operation of the first and second corrective means by means of an electrical impulse initiated at a point remote from the clock, and indicia means for revealing the relative positions of the seconds shaft and the minutes and hours tubes.

4. A synchronous clock comprising a housing having a face plate attached thereto and including a pair of spaced opposing plates, a seconds shaft journaled between said plates, a minutes tube journaled on said seconds shaft, an hours tube journaled on said minutes tube, a synchronous motor operatively mounted on said housing, a master gear loosely disposed on the seconds shaft and being operatively connected to the synchronous motor for regulated movement with respect thereto, a normally engaged friction clutch secured to the seconds shaft and having means in frictional contact with the master gear whereby to cause rotation of the seconds shaft with the master gear, first driving means for coupling the minutes tube to the seconds shaft, second driving means for coupling the hours tube to the minutes tube, first corrective means for rotating the seconds shaft to a predetermined position independently of the friction clutch and at an accelerated speed, second corrective means for rotating the minutes tube to a predetermined position independently of the first driving means and at an accelerated speed, said first and second corrective means being normally idling between said opposing plates but being adapted for operation upon shifting movement therebetween, means for limiting the movement of the seconds shaft and minutes tube during operation of the first and second corrective means, means for initiating operation of the first and second corrective means by means of an electrical impulse initiated at a point remote from the clock, and indicia means for revealing the relative positions of the seconds shaft and the minutes and hours tubes.

5. A synchronous clock comprising a housing having a face plate attached thereto and including a pair of spaced opposing plates, a seconds shaft journaled between said plates, a minutes tube journaled on said seconds shaft, an hours tube journaled on said minutes tube, a synchronous motor operatively mounted on said housing, a master gear loosely disposed on the seconds shaft and being operatively connected to the synchronous motor for regulated movement with respect thereto, a normally engaged friction clutch secured to the seconds shaft and having means in frictional contact with the master gear whereby to cause rotation of the seconds shaft with the master gear, first driving means for coupling the minutes tube to the seconds shaft, said first driving means including an annular gear loosely disposed on the minutes tube and friction means secured to the minutes tube for transferring rotational forces from the annular gear to the minutes tube, second driving means for coupling the hours tube to the minutes tube, first corrective means for rotating the seconds shaft to a predetermined position independently of the friction clutch and at an accelerated speed, second corrective means for rotating the minutes tube to a predetermined position independently of the first driving means and at an accelerated speed, said first and second corrective means being normally idling between said opposing plates but being adapted for operation upon shifting movement therebetween, means for limiting the movement of the seconds shaft and minutes tube during operation of the first and second corrective means, means for initiating operation of the first and second corrective means by means of an electrical impulse initiated at a point remote from the clock, and indicia means for revealing the relative positions of the seconds shaft and the minutes and hours tubes.

6. A synchronous clock comprising a housing having a face plate attached thereto and including a pair of spaced opposing plates, a seconds shaft journaled between said plates, a minutes tube journaled on said seconds shaft, an hours tube journaled on said minutes tube, a synchronous motor operatively mounted on said housing, a master gear loosely disposed on the seconds shaft and being operatively connected to the synchronous motor for regulated movement with respect thereto, a normally engaged friction clutch secured to the seconds shaft and having means in frictional contact with the master gear whereby to cause rotation of the seconds shaft with the master gear, first driving means for coupling the minutes tube to the seconds shaft, said first driving means including an annular gear loosely disposed on the minutes tube and friction means secured to the minutes tube for transferring rotational forces from the annular gear to the minutes tube, second driving means for coupling the hours tube to the minutes tube, a rotatable shaft mounted between the plates in spaced relation to the seconds shaft and being axially shiftable between said plates, spring means for biasing said shaft toward a preselected position between the plates, a coupling gear secured to said rotatable shaft and being in meshed engagement with the master gear, said coupling gear being axially elongated for retaining meshed engagement with the master gear as said rotatable shaft is shifted between said plates whereby said shaft rotates continuously with the master gear, first corrective means for directly coupling said rotatable shaft and the seconds shaft upon shifting movement whereby the seconds shaft is directly driven by the rotatable shaft and slippage occurs between the master gear and the friction clutch, second corrective means for directly coupling the minutes tube to the rotatable shaft whereby the minutes tube is also driven by the rotatable shaft and slippage occurs by the annular gear and the friction means, said first and second corrective means being normally idling between said opposing plates but being adapted for operation upon shifting movement of the rotatable shaft, means for limiting the movement of the seconds shaft and minutes tube to predetermined positions during operation of the first and second corrective means, means for shifting said rotatable shaft between the plates against the spring bias, said means being responsive to an electrical impulse initiated at a point remote from the clock, and indicia means for revealing the relative positions of the seconds shaft and the minutes and hours tubes.

7. The device of claim 6 wherein the first corrective means includes a first pair of complementary gears, one being secured to the rotatable shaft for rotation therewith and the other being secured to the seconds shaft, and the second corrective means includes a second pair of complementary gears, one being secured to the rotatable shaft for rotation therewith and the other being secured to the minutes tube, all of said complementary gears being normally out of meshed engagement but being located so that upon shifting movement of the rotatable shaft against the bias of the spring means, said gears will become engaged.

8. The device of claim 6 wherein the first corrective means includes a first pair of complementary gears, one being secured to the rotatable shaft for rotation therewith and the other being secured to the seconds shaft, and the second corrective means includes a second pair of complementary gears, one being secured to the rotatable shaft for rotation therewith and the other being secured to the minutes tube, all of said complementary gears being normally out of meshed engagement but being located so that upon shifting movement of the rotatable shaft against the bias of the spring means, said gears will become engaged, said other gear of the first pair of complementary gears and said other gear of the second pair of complementary gears each having a plurality of consecutive teeth removed from their respective peripheries to form a gap thereon, whereby when the seconds shaft and the minutes tube each reach a preselected position, the gap will be presented to the complementary gear on the rotatable shaft, thereby causing the loss of meshed engagement between the complementary gears.

9. The device of claim 6 wherein the first corrective means includes a first pair of complementary gears, one being secured to the rotatable shaft for rotation therewith and the other being secured to the seconds shaft, the second corrective means includes a second pair of complementary gears, one being secured to the rotatable shaft for rotation therewith and the other being secured to the minutes tube, all of said complementary gears being normally out of meshed engagement but being located so that upon shifting movement of the rotatable shaft against the bias of the spring means, said gears will become engaged, and the means for limiting the movements of the seconds shaft and minutes tube includes a stop located on the complementary gears of the first and second pairs of complementary gears which are mounted on the seconds shaft and the minutes tube, and a pair of stop-engaging arms pivotally mounted between the plates and mechanically linked to the rotatable shaft, said arms being normally spaced from the stops but being adapted for restraining movement of the gears on which the stops are mounted when said gears have attained a preselected position and the rotatable shaft has been shifted.

10. The combination with the device of claim 6, of an hours tube corrective means including cam means secured to the hours tube, sensing means pivotally mounted between the plates for determining when the hours tube has reached a predetermined position, and stop means for preventing the shifting of the rotatable shaft against the spring bias when the hours tube has attained that preselected position.

11. A mechanism for correcting the position of the hour hand on a synchronous clock including a housing, a seconds shaft rotatably mounted within said housing, a minutes tube journaled on said seconds shaft, an hours tube journaled on said minutes tube, and spring-biased electrically-responsive means for correcting the positions of the seconds shaft and the minutes tube and including a rotatable shaft shiftably mounted within said housing and a means responsive to an electrical signal for causing the shifting of the rotatable shaft, said mechanism comprising a cam secured to the hours tube and being provided with a notch, a radially extending ferrule secured to the rotatable shaft in substantial alignment with the cam, and a lever arm pivotally mounted in the housing and having a tab sized for projection into the notch and a means for holding the rotatable shaft against shifting movement when the tab is in alignment with said notch.

12. A mechanism for correcting the position of the hour hand on a synchronous clock including a housing, a seconds shaft rotatably mounted within said housing, a minutes tube journaled in said seconds shaft, an hours tube journaled on said minutes tube, and spring-biased electrically-responsive means for correcting the positions of the seconds shaft and the minutes tube and including a rotatable shaft shiftably mounted within said housing and a means responsive to an electrical signal for causing the shifting of the rotatable shaft, said mechanism comprising a cam secured to the hours tube and being provided with a notch, a radially extending ferrule secured to the rotatable shaft in substantial alignment with the cam, and a spring-biased lever arm pivotally mounted in the housing and having a tab sized for projection into the notch and a shoulder integrally formed on the lever arm and sized for abutment with the ferrule when the tab has been urged into the notch by the spring-biasing of the lever arm, whereby upon receipt of an electrical signal, the rotatable shaft will be held from shifting movement by the combination of the shoulder and the ferrule.

References Cited in the file of this patent

UNITED STATES PATENTS

| | | |
|---|---|---|
| 2,198,632 | Mullan | Apr. 30, 1940 |
| 2,332,278 | Stone | Oct. 19, 1943 |
| 2,624,170 | Benson | Jan. 6, 1953 |
| 2,662,367 | Riggs | Dec. 15, 1953 |
| 2,700,271 | Spricker | Jan. 25, 1955 |
| 2,900,787 | Blouin | Aug. 25, 1959 |
| 3,028,722 | Kleimeyer | Apr. 10, 1962 |